United States Patent
Shinohara

(10) Patent No.: US 7,713,613 B2
(45) Date of Patent: May 11, 2010

(54) COMPOSITION FOR ANTISTATIC LAYER

(75) Inventor: Seiji Shinohara, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 11/225,897

(22) Filed: Sep. 13, 2005

(65) Prior Publication Data

US 2006/0172128 A1    Aug. 3, 2006

(30) Foreign Application Priority Data

| Oct. 1, 2004 | (JP) | ............................. 2004-290833 |
| Oct. 1, 2004 | (JP) | ............................. 2004-290834 |
| Oct. 1, 2004 | (JP) | ............................. 2004-290835 |
| Oct. 1, 2004 | (JP) | ............................. 2004-290836 |

(51) Int. Cl.
  *B32B 27/32* (2006.01)
  *B32B 3/26* (2006.01)
  *B32B 5/14* (2006.01)
  *B32B 9/00* (2006.01)
  *B32B 5/16* (2006.01)
  *B32B 17/10* (2006.01)

(52) U.S. Cl. ........................ 428/220; 428/323; 428/328; 428/329; 428/330; 428/332; 428/334; 428/336; 428/337; 428/304.4; 428/307.3; 428/318.4

(58) Field of Classification Search ....................... None
See application file for complete search history.

(56) References Cited

U.S. PATENT DOCUMENTS

| 5,484,694 | A | * | 1/1996 | Lelental et al. | ............. 430/530 |
| 5,698,315 | A | * | 12/1997 | Hayashi et al. | ............. 428/336 |
| 6,064,524 | A | * | 5/2000 | Oka et al. | .................... 359/582 |
| 2003/0031856 | A1 | * | 2/2003 | Hareyama et al. | ........ 428/313.3 |

* cited by examiner

*Primary Examiner*—Sheeba Ahmed
(74) *Attorney, Agent, or Firm*—Burr & Brown

(57) ABSTRACT

The present invention discloses a composition for antistatic layer formation, which has realized antireflection and prevention of interference fringes. The composition for antistatic layer formation comprises electrically conductive fine particles, an ionizing radiation curing resin, and an organic solvent, the electrically conductive fine particles each comprising a core particle covered with an electrically conductive material, the refractive index of the core particle being lower than that of the electrically conductive material.

21 Claims, 2 Drawing Sheets

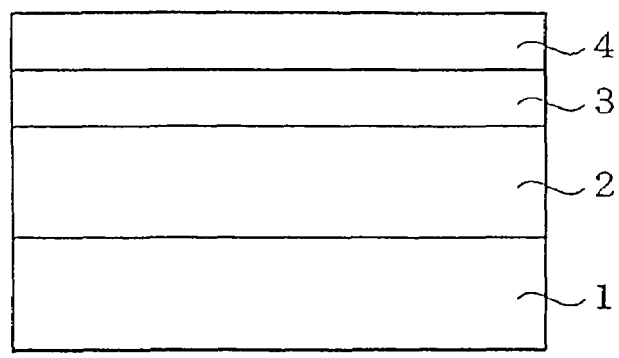
F I G. 2
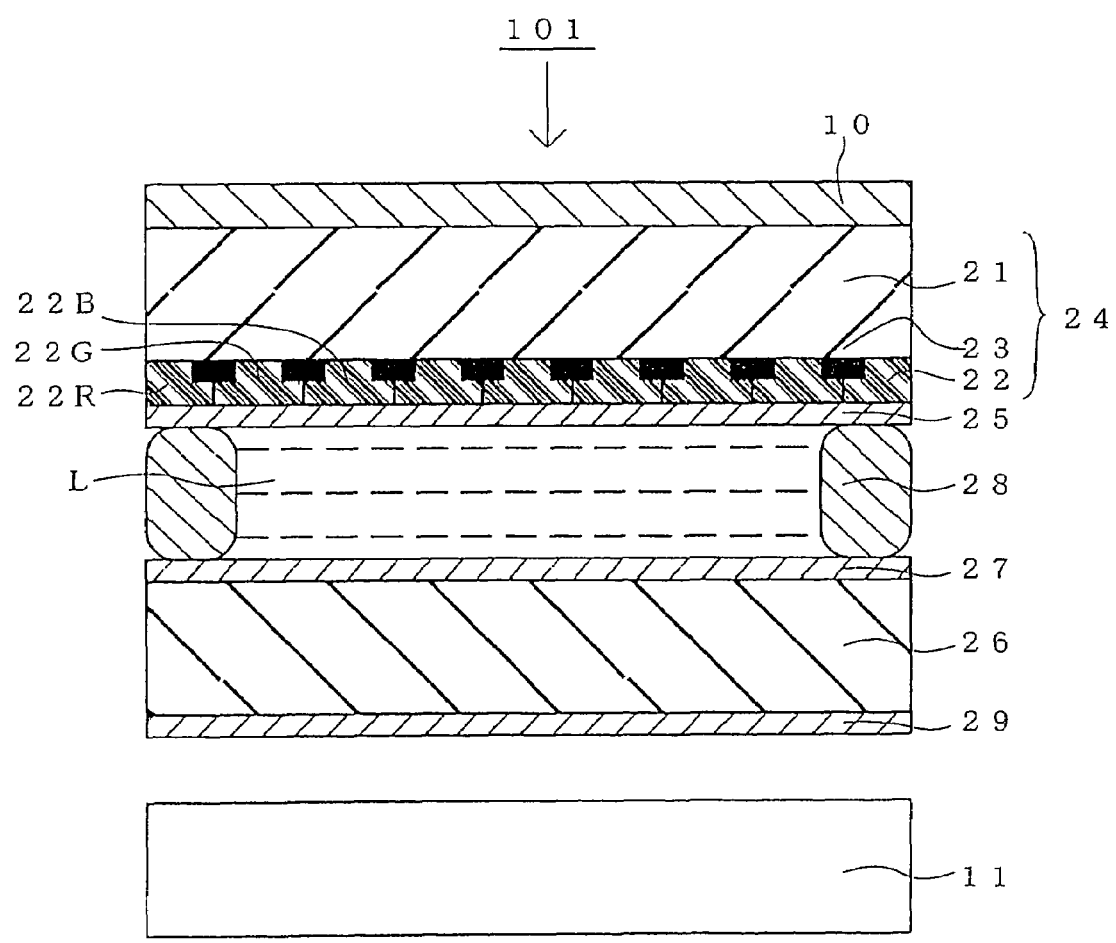
F I G. 3

COMPOSITION FOR ANTISTATIC LAYER

RELATED APPLICATION

The present application is a patent application claiming priority based on Japanese Patent Application Nos. 290833/2004, 290834/2004, 290835/2004, and 290836/2004 under the Paris Convention, and, thus, the disclosure thereof is totally incorporated herein.

TECHNICAL FIELD

The present invention relates to a composition for the formation of an antistatic layer provided for preventing the occurrence of interference fringes and the adherence of dust, and an antistatic layer for use in antireflection films provided on the surface of optical articles of various displays such as liquid crystal displays or plasma displays.

BACKGROUND ART

First Aspect of Invention and Third Aspect of Invention

Display surfaces of optical articles such as liquid crystal displays and plasma displays are required to cause no significant reflection of light applied from external light sources such as fluorescent lamps from the viewpoint of enhancing visibility. A phenomenon that the reflectance is reduced by covering the surface of a transparent object with a transparent film having a low refractive index has hitherto been known in the art. Therefore, the visibility can be improved by providing an antireflection film utilizing this phenomenon onto the display surface of an image display device. The antireflection film may have a single-layer structure comprising a low refractive index layer having a low refractive index provided on a display surface, or a multilayer structure comprising one or a plurality of medium to high refractive index layers, for further improving the antireflection effect, provided on a display surface and a low refractive index layer provided on the antireflection effect improving layer(s).

The antireflection film having a single-layer structure has a simpler layer construction than the multilayered antireflection film and thus has superior productivity and cost performance. On the other hand, for the multilayered antireflection film, advantageously, the antireflection properties can be improved by combining layer constructions and thus can realize high performance than the antireflection film having a single layer structure. Further, damage to the surface of an optical article deteriorates the visibility, and, thus, it is common practice to impart hard properties to the antireflection film. Furthermore, an optical article formed of plastic has insulating properties and thus is electrified upon exposure to static electricity and the like, and the adherence of dust onto the surface deteriorates the visual field. This has led to a demand for imparting antistatic properties to optical articles.

An antistatic antireflection film produced by forming a metal oxide-containing antistatic layer on a transparent base material film, further forming a hardcoat layer on the antistatic layer, and forming, as the uppermost layer, a low refractive index layer having a lower refractive index than the underlying layer is known as a film to which these antistatic properties and hard properties have been imparted to antireflection films (for example, Japanese Patent Laid-Open No. 255403/2001).

Japanese Patent Laid-Open No. 255403/2001 describes an antireflection film comprising an antistatic layer which uses a metal oxide or a metal as an antistatic material from the viewpoint of preventing a deterioration in visual field caused by the adherence of dust on the surface of displays. Since metal oxides or metals generally have a higher refractive index than a binder resin, an antistatic layer with a metal oxide or a metal added thereto has a higher refractive index than the base material film or the hardcoat layer and, thus, a refractive index difference occurs between the base material film and the antistatic layer or between the hardcoat layer and the antistatic layer. The refractive index difference poses a problem that interference fringes, which deteriorate the visibility of optical articles such as displays, occur.

For example, for an example of an antireflection film comprising a conventional general antistatic layer, a triacetylcellulose film (a transparent base material film) has a refractive index of about 1.5, a metal oxide-containing or metal-containing antistatic layer has a refractive index of about 1.57 to 1.70, and the hardcoat layer has a refractive index of about 1.50. This great difference in refractive index between layers in contact with each other causes a problem that external light which entered from surface side is reflected from the interface of the transparent base material film and the antistatic layer and the interface of the antistatic layer and the hardcoat layer and the reflected lights cause interferences which are sometimes observed as uneven interference (color shading).

Accordingly, there is an urgent need for the development of a composition for the formation of an antistatic layer which can effectively prevent the occurrence of interference fringes and dust adherence, and an antistatic layer for use in an antireflection film formed using this composition.

Second Aspect of Invention and Fourth Aspect of Invention

Display surfaces of optical articles such as liquid crystal displays and plasma displays are required to cause no significant reflection of light applied from external light sources such as fluorescent lamps from the viewpoint of enhancing visibility. For antireflection purposes, it is common practice to apply an antireflection film, prepared by forming a low refractive index layer having a lower refractive index than the underlying layer either, onto a transparent base material film directly or through other layer, onto the surface of an optical article. Further, damage to the surface of an optical article deteriorates the visibility, and, thus, it is common practice to impart hard properties to the antireflection film. Furthermore, an optical article formed of plastic has insulating properties and thus is electrified upon exposure to static electricity and the like, and the adherence of dust onto the surface deteriorates the visual field. This has led to a demand for imparting antistatic properties to optical articles.

An antistatic antireflection film produced by forming a hardcoat layer on a transparent base material film, forming a metal oxide-containing antistatic layer on the hardcoat layer, and forming, as the uppermost layer, a low refractive index layer having a lower refractive index than the underlying layer is known as a film to which these antistatic properties and hard properties have been imparted to antireflection films (for example, Japanese Patent Laid-Open No. 267804/2002). In the antireflection film disclosed in Japanese Patent Laid-Open No. 267804/2002, the refractive index of the antistatic layer is described to be not less than 1.60 and not more than 1.75.

The refractive index of the antistatic layer containing a metal oxide as an antistatic agent is generally in the range of about 1.57 to 1.75. When an antireflection film having a laminate structure of transparent base material film/hardcoat layer/antistatic layer/low refractive index layer (refractive index n=not more than 1.42) is formed by designing a low refractive index layer so that the minimum reflectance is provided at a wavelength of 550 nm, and stacking the conventional low refractive index layer (n=not more than 1.42)

onto an antistatic layer having a refractive index of about 1.57 to 1.75, due to a large difference in refractive index between both the layers, a V-shaped reflectance curve is provided. That is, the reflectance in a short wave area and the reflectance in a long wave area in a visible light region are high, leading to a problem that a reddish/bluish color occurs in the antireflection film and the strength of color at the time of reflection increases with increasing the refractive index difference. Such coloring is particularly significant when the antistatic layer is a thin film having a thickness of 50 nm to 150 nm and, at the same time, the low refractive index layer is a thin film having a thickness of 50 nm to 150 nm.

FIG. 1 is a reflectance curve in which the reflectance (%) is plotted as ordinate and the light wavelength (nm) is plotted as abscissa in the case where, in an antireflection film having a laminate structure of transparent base material film/hardcoat layer/antistatic layer/low refractive index layer, the low refractive index layer has a refractive index ($n^1$) of 1.37 and the antistatic layer has a refractive index ($n^2$) on levels of 1.53, 1.57, 1.61, and 1.65. In FIG. 1, a curve indicated by a solid line shows a reflectance curve of the antireflection film comprising no antistatic layer. As is apparent from FIG. 1, the larger the difference in refractive index between the antistatic layer and the low refractive index layer, the larger the curve in the V-shaped curve and the higher the reflectance in the short wave area and the long wave area and, thus, the stronger the reddish/bluish color in the antireflection film.

Accordingly, there is an urgent need for the development of an antireflection film comprising an antistatic layer having a laminate structure of transparent base material film/hardcoat layer/antistatic layer (thin film)/low refractive index layer (thin film) in which coloring at the time of reflection has been prevented.

DISCLOSURE OF THE INVENTION

First Aspect of Invention

At the time of the present invention, the present inventor has found that an antistatic layer which can prevent the occurrence of interference fringes and the adherence of dust can be provided by using a composition for antistatic layer formation (coating composition) containing an electrically conductive metal oxide or metal having a high refractive index. The first aspect of the present invention has been made based on such finding.

Thus, according to the first aspect of the present invention, there is provided a coating composition for antistatic layer formation, comprising: (1) electrically conductive fine particles each comprising a core particle covered with an electrically conductive material, the refractive index of said core particle being lower than that of said electrically conductive material; (2) an ionizing radiation curing resin; and (3) an organic solvent.

More preferably, in the first aspect of the present invention, the composition for antistatic layer formation comprises electrically conductive fine particles, an ionizing radiation curing resin, and an organic solvent. In this composition for antistatic layer formation, the electrically conductive fine particles each comprise a core particle covered with an electrically conductive material, the refractive index of said core particle being lower than that of said electrically conductive material.

Further, in the first aspect of the present invention, there is also provided an antireflection film comprising: a transparent base material film; and an antistatic layer, a hardcoat layer formed using a composition comprising an ionizing radiation curing resin, and a low refractive index layer provided in that order on said transparent base material film.

In this antireflection film,
the antistatic layer has been formed using the composition for antistatic layer formation according to the first aspect of the present invention.

Effect

In the composition for antistatic layer formation according to the first aspect of the present invention, by virtue of the construction in which electrically conductive fine particles each comprising a core particle covered with an electrically conductive metal oxide or metal as an electrically conductive material is contained as an antistatic agent and, at the same time, the refractive index of fine particles used as the core particles is lower than that of the electrically conductive material, the refractive index of the antistatic layer formed using the composition for antistatic layer formation according to the present invention can be rendered lower than the refractive index of the antistatic layer formed using a composition comprising conventional electrically conductive fine particles of an electrically conductive metal oxide or metal. By virtue of this, in the antireflection film formed using the composition for antistatic layer formation according to the present invention, the absolute value of the difference in refractive index between the transparent base material film and the antistatic layer and the absolute value of the difference in refractive index between the antistatic layer and the hardcoat layer each can be brought to not more than 0.03, and, thus, the occurrence of interference fringes at the interface between the transparent base material film and the antistatic layer and at the interference between the antistatic layer and the hardcoat layer can be advantageously effectively prevented.

Second Aspect of Invention

At the time of the present invention, the present inventor has found that an antireflection film comprising an antistatic layer which can prevent coloring at the time of the reflection can be provided by using an electrically conductive metal oxide having a high refractive index in an antistatic layer of an antireflection film. The second aspect of the present invention has been made based on such finding.

Thus, according to the second aspect of the present invention, there is provided an antireflection film. The antireflection film has been produced by forming an ionizing radiation curing resin-containing hardcoat layer on a transparent base material film, then forming an antistatic layer having a thickness of 50 nm to 150 nm using a composition for antistatic layer formation containing electrically conductive fine particles each comprising a core particle covered with an electrically conductive material, the refractive index of the core particle being lower than the refractive index of the electrically conductive material, an ionizing radiation curing resin, and an organic solvent, and then forming a 50 nm to 150 nm-thick low refractive index layer having a lower refractive index than the underlying layer in direct contact with the low refractive index layer, the reflected hue of said antireflection film being such that the absolute value of the hue a* and the absolute value of the hue b* as specified in JIS Z 8729 are not more than 7 and not more than 6, respectively.

More preferably, the antireflection film according to the second aspect of the present invention comprises: a transparent base material film; and a hardcoat layer formed using a composition comprising an ionizing radiation curing resin, an antistatic layer, and a low refractive index layer provided in that order on said transparent base material film, wherein said antistatic layer has been formed using the composition for antistatic layer formation according to the first aspect of the present invention, the thickness of said antistatic layer is not less than 50 nm and not more than 150 nm, the thickness of said low-refractive index layer is not less than 50 nm and not more than 150 nm, and the reflected hue of said antireflection film is such that the absolute value of the hue a* is not more than 7 and the absolute value of the hue b* is not more than 6.

Effect

The antistatic layer in the antireflection film according to the second aspect of the present invention has been formed using a composition for antistatic layer formation containing electrically conductive fine particles each comprising a core particle covered with an electrically conductive material, the refractive index of the core particle being lower than that of the electrically conductive material, an ionizing radiation curing resin, and an organic solvent. As a result, the refractive index of the antistatic layer in the antireflection film according to the present invention can be regulated to be lower than the antistatic layer formed using a coating composition containing the conventional electrically conductive metal oxide or electrically condutive metal. Thus since the difference in refractive index between the antistatic layer and the low refractive index layer can be regulated, an antireflection film can be provided which can realize antireflective properties and, at the same time, comprises an antistatic layer of which the refractive index has been regulated so as to prevent coloring, that is, so that the reflected hue is such that the absolute value of the hue a* and the absolute value of the hue b* as specified in JIS Z 8729 are not more than 7 and not more than 6, respectively.

Third Aspect of Invention

At the time of the present invention, the present inventor has found that an antistatic layer which can prevent the occurrence of interference fringes and the adherence of dust can be provided by using an electrically conductive metal oxide having a high refractive index in a composition (coating composition) for antistatic layer formation. The third aspect of the present invention has been made based on such finding.

Thus, according to the third aspect of the present invention, there is provided a composition (coating composition) for antistatic layer formation comprising (1) void-containing electrically conductive metal oxide fine particles, (2) an ionizing radiation curing resin, and (3) an organic solvent.

According to the third aspect of the present invention, there is also provided an antireflection film comprising: a transparent base material film; and an antistatic layer and a hardcoat layer formed using a composition comprising an ionizing radiation curing resin and a low refractive index layer provided in that order on said transparent base material film.

In This Antireflection Film, the antistatic layer has been formed using the composition for antistatic layer formation according to the third aspect of the present invention.

Effect

Since the composition for antistatic layer formation according to the third aspect of the present invention contains void-containing electrically conductive metal oxide fine particles as an antistatic agent, the antistatic layer formed using the composition for antistatic layer formation according to the third aspect of the present invention contains air having a refractive index of 1 in the voids, and, hence, the refractive index can be rendered lower than the refractive index of the antistatic layer formed using a coating composition comprising conventional void-free electrically conductive metal oxide fine particles. By virtue of this, in the antireflection film according to another embodiment in the third aspect of the present invention formed using the composition for antistatic layer formation according to the third aspect of the present invention, the absolute value of the difference in refractive index between the transparent base material film and the antistatic layer and the absolute value of the difference in refractive index between the antistatic layer and the hardcoat layer each can be brought to not more than 0.03, and, thus, the occurrence of interference fringes at the interface of the transparent base material film and the antistatic layer and at the interface of the antistatic layer and the hardcoat layer can be advantageously prevented.

Fourth Aspect of Invention

At the time of the present invention, the present inventor has found that an antireflection film comprising an antistatic layer which can prevent coloring upon reflection can be provided by using void-containing electrically conductive metal oxide fine particles having a high refractive index in an antistatic layer of an antireflection film. The fourth aspect of the present invention has been made based on such finding.

Thus, according to the fourth aspect of the present invention, there is provided an antireflection film. The antireflection film is an antireflection film which can prevent coloring and is characterized by being produced by forming an ionizing radiation curing resin-containing hardcoat layer on a transparent base material film, then forming an antistatic layer having a thickness of 50 nm to 150 nm using a composition for antistatic layer formation containing void-containing electrically conductive metal oxide fine particles, an ionizing radiation curing resin, and an organic solvent, and then forming a 50 nm to 150 nm-thick low refractive index layer having a lower refractive index than the underlying layer in direct contact with the antistatic layer, the reflected hue of said antireflection film being such that the absolute value of the hue a* and the absolute value of the hue b* as specified in JIS Z 8729 are not more than 7 and not more than 6, respectively.

More preferably, the antireflection film according to the fourth aspect of the present invention comprises: a transparent base material film; and a hardcoat layer formed using a composition comprising an ionizing radiation curing resin, an antistatic layer, and a low refractive index layer provided in that order on said transparent base material film, wherein said antistatic layer has been formed using the composition for antistatic layer formation according to the third aspect of the present invention, the thickness of said antistatic layer is not less than 50 nm and not more than 150 nm, the thickness of said low-refractive index layer is not less than 50 nm and not more than 150 nm, and the reflected hue of said antireflection film is such that the absolute value of the hue a* is not more than 7 and the absolute value of the hue b* is not more than 6.

Effect

The antistatic layer in the antireflection film according to the fourth aspect of the present invention has been formed using a composition for antistatic layer formation containing void-containing electrically conductive metal oxide fine particles, an ionizing radiation curing resin, and an organic solvent. As a result, the refractive index of the antistatic layer in the antireflection film according to the present invention can be regulated to be lower than the antistatic layer formed using a coating composition containing the conventional electrically conductive metal oxide or electrically conductive metal. Thus since the difference in refractive index between the antistatic layer and the low refractive index layer can be regulated, an antireflection film can be provided which can realize antireflective properties and, at the same time, comprises an antistatic layer of which the refractive index has been regulated so as to prevent coloring, that is, so that the reflected hue is such that the absolute value of the hue a* and the absolute value of the hue b* as specified in JIS Z 8729 are not more than 7 and not more than 6, respectively.

BRIEF DESCRIPTION OF THE DRAWINGS

FIG. 2 is a schematic cross-sectional view showing the layer construction of an antireflection film according to the present invention; and FIG. 3 is a typical sectional view of an example of a liquid crystal display device of which the display surface has been covered with a polarizing film with an antireflection film according to the present invention stacked thereonto.

DESCRIPTION OF REFERENCE CHARACTERS IN THE DRAWINGS

Figure 1:
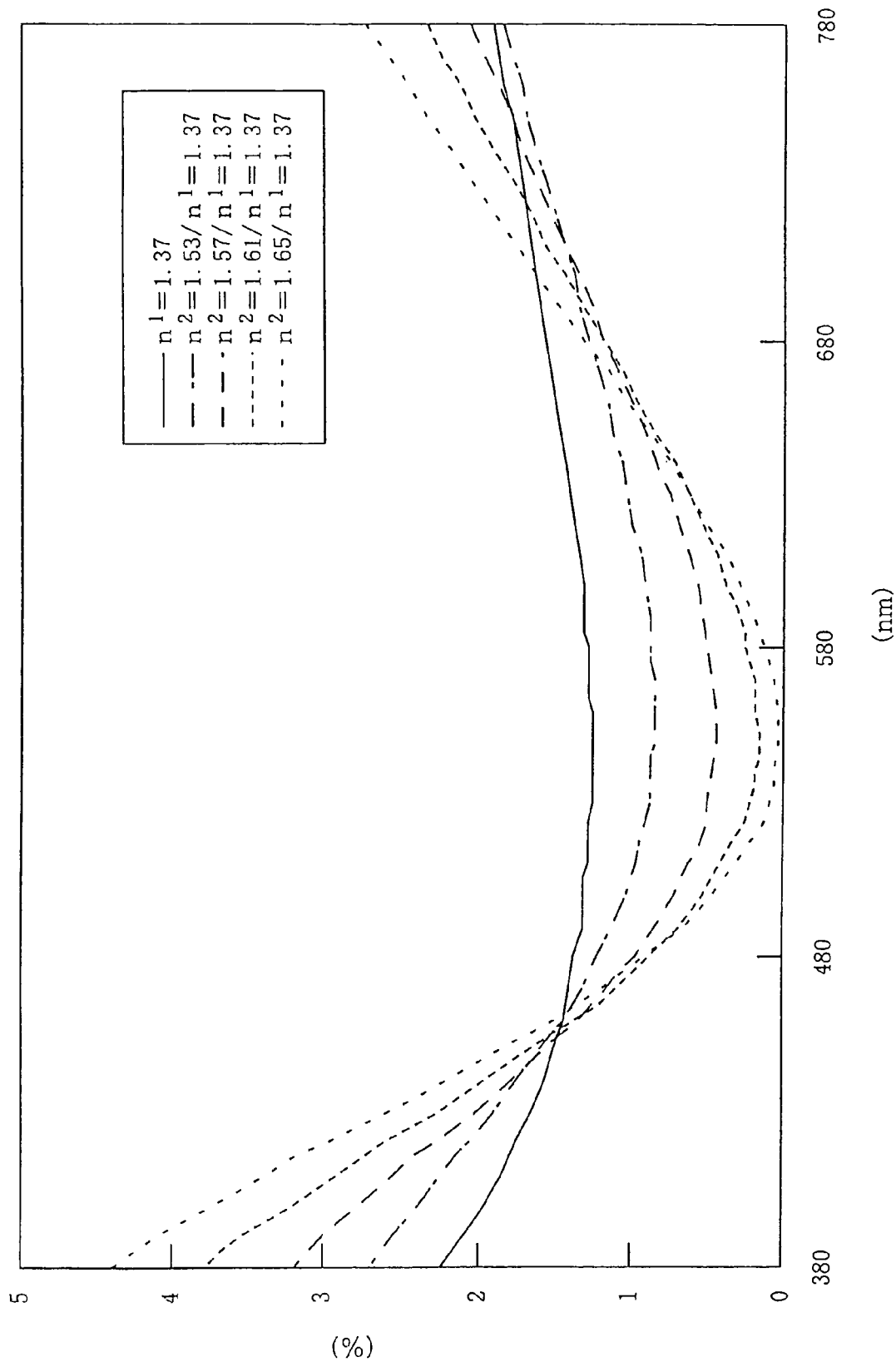
FIG. 1 is a graph showing a reflectance curve in which the reflectance (%) is plotted as ordinate and the light wavelength (nm) is plotted as abscissa in the case where, in an antireflection film having a laminate structure of transparent base material film/hardcoat layer/antistatic layer/low refractive index layer, the low refractive index layer has a refractive index ($n^1$) of 1.37 and the antistatic layer has a refractive index ($n^2$) on levels of 1.53, 1.57, 1.61, and 1.65.

1 transparent base material film; 2 antistatic layer; 3 hardcoat layer; 4 low-refractive index layer; 10 polarizing film; 11 backlight unit; 21 glass substrate; 22 pixel part; 23 black matrix layer; 24 color filter; 25 transparent electrode layer; 26 glass substrate; 27 transparent electrode layer; 28 sealing material; 29 aligning film; and 101 liquid crystal display device.

DETAILED DESCRIPTION OF THE INVENTION

Definition

In the present invention, hue a* and hue b* are indexes in a color coordinate specified in JIS Z 8729 (JIS HANDBOOK 33 "Shikisai (Color)-1996," edited by Japanese Standards Association). According to JIS Z 8729, the color tone of a measuring object is expressed by three values of lightness L*, hue a*, and hue b*. The larger the lightness L*, the higher the lightness. The hue a* represents a reddish tint. The larger the numerical value, the stronger the reddish tint. When the numerical value is a minus (−) value, the reddish tint is unsatisfactory, that is, the greenish tint is strong. Further, the hue b* is an index of a yellowish tint. The larger the numerical value, the stronger the yellowish tint. When the numerical value is a minus (−) value, the yellowish tint is unsatisfactory, that is, the color is bluish. When both the hue a* and the hue b* are 0 (zero), the tone is colorless. Here L*a*b* are indexes which indicate a CIE color space which was adopted in the 18$^{th}$ London meeting in 1975 and was recommended as a CIEL1975 L*a*b* uniform color space and a color difference based on this space.

First Aspect of Invention

Composition for Antistatic Layer Formation (Coating Composition for Antistatic Layer Formation)

Electrically Conductive Fine Particles (1) Type

In the present invention, the electrically conductive fine particles each comprising a core particle as an internal particle and an electrically conductive material covering the outer part of the core particle are used as an antistatic agent for imparting electrostatic properties to a coating film. An electrically conductive metal oxide or an electrically conductive metal is used as the electrically conductive material. The electrically conductive metal oxide is selected from, for example, tin oxide ($SnO_2$), antimony tin oxide (ATO), indium tin oxide (ITO), antimony oxide ($Sb_2O_5$), aluminum zinc oxide (AZO), gallium zinc oxide, and mixtures thereof. The electrically conductive metal may be selected from, for example, gold, silver, copper, aluminum, iron, nickel, palladium, platinum and mixtures thereof.

Core particles include fine particles, for example, inorganic fine particles such as silica fine particles, for example, colloidal silica fine particles and silicon oxide fine particles; polymer fine particles such as fluororesin fine particles, acrylic resin fine particles, and silicone resin fine particles; and organic-inorganic composite particles. When the fine particles are porous/hollow fine particles, the refractive index is lower. The core particles usable in the present invention have a lower refractive index than the electrically conductive material, e.g., electrically conductive metal oxides or metals.

(2) Shape; Particle Diameter

In the present invention, the diameter of the electrically conductive fine particles each comprising a core particle as an internal particle and an electrically conductive material such as an electrically conductive metal oxide or metal covering the outer part of the core particle is preferably 5 nm to 100 nm, more preferably 10 nm to 50 nm. When the particle diameter falls within the above-defined range, the transparency is excellent and, at the same time, the dispersion of the electrically conductive fine particles is good.

The coverage of the electrically conductive material in the electrically conductive fine particles is preferably 10% by mass to 60% by mass, more preferably 20% by mass to 50% by mass. When the coverage is in the above-defined range, the surface resistivity of the electrically conductive fine particles is lowered and desired antistatic properties are provided. Further, in this case, the effect of reducing the refractive index of electrically conductive materials such as electrically conductive metal oxides or metals is enhanced and a desired refractive index is provided.

(3) Covering Method

For example, for silica fine particles, core particles may be covered with an electrically conductive material by a method which comprises slurrying silica fine particles in an aqueous solution of a metal oxide (for example, ATO), neutralizing and hydrolyzing ATO, and firing the hydrolyzate. The state of covering can be regulated according to neutralization hydrolysis conditions (temperature, time, and pH) and firing conditions (temperature, time, and a firing atmosphere).

Alternatively, a method may be adopted which comprises heating a silicon oxide salt as core particles, introducing the resultant vapor into a reactor to conduct a thermal decomposition reaction and thus to produce silicon oxide particles, then heating a metal salt as a raw material for the covering layer, introducing the resultant vapor into the reactor containing the silicon oxide fine particles where a thermal decomposition reaction is carried out to form a covering layer of a metal oxide on the surface of the core particles (Japanese Patent Laid-Open No. 319808/1993).

Further, a method may also be adopted which comprises heating a mixture comprising a metal carboxylate and an alcohol in the presence of core particles, or a mixture comprising a metal alkoxy group-containing compound and a carboxyl group-containing compound to cover the surface of the core particles with a metal oxide (Japanese Patent Laid-Open No. 99358/2004).

Ionizing Radiation Curing-Type Resin

A monomer, an oligomer, and a polymer containing a polymerizable functional group, which, upon exposure to an ionizing radiation, can cause a reaction for increasing the size of the molecule such as polymerization or dimerization directly or indirectly through the action of an initiator, may be used in the ionizing radiation curing-type resin. Specifically, radically polymerizable monomers and oligomers containing ethylenically unsaturated bonds such as an acrylic, vinyl, or allyl group are preferred. In order to form a crosslinking bond between molecules of a binder component, preferably, the binder component is a polyfunctional binder component containing two or more, preferably three or more, per molecule, polymerizable functional groups. However, other ionizing radiation curable binder components may be used. For example, a photocation-polymerizable monomer or oligomer such as an epoxy-containing compound may be used. In order to improve the electrical conductivity, a hydrophilic binder such as an EO-modified hydrophilic binder which can improve ion propagation is preferred. Further, the use of a binder component in which hydroxyl groups are allowed to stay in the molecule is preferred. The hydroxyl groups contained in the binder can improve the adhesion to the adjacent layer such as a hardcoat layer or a transparent base material film through a hydrogen bond.

Monomers which are preferably used in the above ionizing radiation curing-type resin composition include, for example, polyfunctional (meth)acrylates, for example, di(meth)acrylates such as ethylene glycol di(meth)acrylate, and pentaerithritol di(meth)acrylate monostearate; tri(meth)acrylates such as trimethylolpropane tri(meth)acrylate, and pentaerithritol tri(meth)acrylate; pentaerithritol tetra(meth)acrylate derivatives and dipentaerithritol penta(meth)acrylate; and EO-modified products of the above compounds.

In addition, oligomers having a number average molecular weight (number average molecular weight in terms of polystyrene as measured by a GPC method) of not more than 20000 such as epoxy acrylate resins (for example, "Epoxy Ester" manufactured by Kyoeisha Chemical Co., Ltd. and "Epoxy" manufactured by Showa High Polymer Co., Ltd.), and urethane acrylate resins produced by polyaddition of various isocyanates with a hydroxyl group-containing monomer through a urethane bond ("Shiko," manufactured by Nippon Synthetic Chemical Industry Co., Ltd. and "Urethane Acrylate" manufactured by Kyoeisha Chemical Co., Ltd.) are also preferred.

These monomers and oligomers are components that have the effect of significantly enhancing the crosslinking density of the coating film and has high fluidity by virtue of its low number average molecular weight of not more than 20000 and thus can advantageously improve the coatability of the coating composition.

Further, if necessary, for example, reactive polymers having a number average molecular weight of not less than 20000 and containing an (meth)acrylate group in its main chain or side chain may be preferably used. These reactive polymers may be purchased as commercially available products, for example, "Macromonomer" manufactured by Toa Gosei Chemical Industry Co., Ltd. Alternatively, an (meth)acrylate group-containing reactive polymer may be produced by previously polymerizing a copolymer of methyl methacrylate with glycidyl methacrylate, and then condensing a glycidyl group in the copolymer with a carboxyl group in methacrylic acid or acrylic acid. The presence of a component having a large molecular weight can improve film forming properties with respect to complicated shapes and can reduce curling and warpage of an antireflection film caused by volumetric shrinkage upon curing.

When the binder resin is a photocuring-type resin, the use of a photoinitiator for initiating radical polymerization is preferred. The photoinitiator is not particularly limited, and examples thereof include acetophenones, benzophenones, ketals, anthraquinones, disulfide compounds, thiuram compounds, and fluoro amine compounds. More specific examples thereof include 1-hydroxy-cyclohexyl-phenyl-ketone, 2-methyl-1[4-(methylthio)phenyl]-2-morpholinopropan-1-one, benzyldimethyl ketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, and benzophenone. Among them, 1-hydroxy-cyclohexyl-phenyl-ketone and 2-methyl-1[4-(methylthio)phenyl]-2-morpholinopropan-1-one, even when present in a small amount, can initiate and promote a polymerization reaction upon exposure to an ionizing radiation and thus are preferably used in the present invention. Either one of these compounds may be used solely, or alternatively both the compounds may be used in combination. These compounds may also be commercially available. For example, 1-hydroxy-cyclohexyl-phenyl-ketone is available from Ciba Specialty Chemicals, K.K. under the tradename designation Irgacure 184.

Organic Solvent

An organic solvent for dissolving and dispersing solid components is indispensable to the composition for antistatic layer formation, and the type of the organic solvent is not particularly limited. Examples of solvents usable herein include alcohols such as methanol, ethanol, and isopropyl alcohol; ketones such as methyl ethyl ketone, methylisobutyl ketone, and cyclohexanone; esters such as ethyl acetate and butyl acetate; halogenated hydrocarbons; aromatic hydrocarbons such as toluene and xylene; or mixtures of these solvents.

Among them, ketone organic solvents are preferred. This is so because, when the solution or dispersion is prepared using the ketone solvent, the solution or dispersion can be coated easily and evenly on the surface of the base material. At the same time, after coating, the evaporation speed of the solvent is adequate, and, thus, uneven drying is less likely to occur and a large area coating film having even thickness can easily be formed.

The amount of the solvent is properly regulated so that the individual components can be evenly dissolved and dispersed, and, during storage after the preparation of the solution or dispersion, the solution or dispersion do not cause aggregation, and, at the time of coating, the solution or dispersion is not excessively dilute. Preferably, the amount of the solvent used is reduced to such an extent that the above requirements are met, for preparing a high-concentration coating composition, the coating composition is stored in the small volume state, and, in use, a necessary amount of the coating composition is extracted for dilution to a concentration suitable for coating work. When the total amount of the solid component and the solvent is 100 parts by weight, the use of 50 to 95.5 parts by weight, based on 0.5 to 50 parts by weight of the total solid content, of the solvent, more preferably 70 to 90 parts by weight, based on 10 to 30 parts by weight of the total solid content, of the solvent can provide a composition for antistatic layer formation, which is particularly excellent in dispersion stability and is suitable for long-term storage.

Other Components

Regarding components other than the above components for the coating composition for antistatic layer formation, if necessary, a polymerization initiator for the ionizing radiation curing binder component may be contained. Further, other components may be incorporated. For example, if necessary, dispersants, ultraviolet shielding agents, ultraviolet absorbers, and surface conditioning agents (leveling agents) may be used.

Method for Preparing Composition for Antistatic Layer Formation

The composition for antistatic layer formation may be already in an ink form, or alternatively may be prepared by combining electrically conductive fine particles each comprising core particles covered with an electrically conductive material, an ionizing radiation curing-type resin, a solvent, and other components or the like. The composition for antistatic layer formation may be prepared using the above components by conducting dispersion treatment according to a conventional method for preparing a coating liquid. For example, when the electrically conductive fine particles are in a colloidal form, the colloid as such may be mixed. On the other hand, when the electrically conductive fine particles are in a powder form, a coating composition for antistatic layer formation may be prepared by introducing media such as beads into the resultant mixture followed by proper dispersion treatment, for example, in a paint shaker or a bead mill.

Antireflection Film

FIG. 2 is a schematic cross-sectional view showing a layer construction of an antireflection film according to the present invention. In the antireflection film shown in FIG. 2, an antistatic layer 2 is provided on a transparent base material film 1, a hardcoat layer 3 is provided on the antistatic layer 2, and a low refractive index layer 4 is provided on the hardcoat layer 3.

Antistatic Layer

In the antireflection film according to the present invention, when the thickness of the antistatic layer is 0.05 to 5.0 μm a surface resistivity of not more than $1.0 \times 10^{13}$ Ω/□ necessary for the prevention of dust adherence can be realized. When the surface resistivity is $1.0 \times 10^{13}$ Ω/□ to $1.0 \times 10^{12}$ Ω/□, electrification occurs but electrostatic charges are not accumulated and, thus, dust adherence preventive properties can be imparted to the film or the like. Preferably, the surface resistivity is in the range of $1.0 \times 10^{12}$ Ω/□ to $1.0 \times 10^{10}$ Ω/□ in which electrification of electrostatic charges occurs but the electrostatic charges are immediately attenuated. More preferably, the surface resistivity is not more than $1.0 \times 10^{10}$ Ω/□, most preferably not more than $1.0 \times 10^{8}$ Ω/□ in which electrification does not occur.

The antistatic layer may be formed by coating the above composition for antistatic layer formation, for example, by various methods such as spin coating, dip coating, spray coating, slide coating, bar coating, roll coating, meniscus coating, flexographic printing, screen printing, or bead coating, onto a transparent base material film or each layer in the antireflection film. In general, the coated product is if necessary dried, followed by the application of an ionizing radiation such as ultraviolet light or electron beams for curing to form an antistatic layer.

Transparent Base Material Film

The material for the transparent base material film may be any material commonly used in the antireflection film, without particular limitation and examples thereof include films formed of various resins, for example, cellulose triacetate (TAC), polyethylene terephthalate (PET), diacetyl cellulose, cellulose acetate butylate, polyethersulfone, acrylic resin, polyurethane resin, polyester, polycarbonate, polysulfone, polyether, trimethylpentene, polyether ketone, and (meth) acrylonitrile. The thickness of the base material is generally about 25 μm to 1000 μm.

Hardcoat Layer

The hardcoat layer is formed to impart scratch resistance, strength or other properties to the laminate per se and is indispensable to the construction of the present invention. The term "hardcoat layer" as used herein refers to a coat layer having a hardness of H or higher as determined by a pencil hardness test specified in JIS 5600-5-4: 1999.

The hardcoat layer is preferably formed using an ionizing radiation curing-type resin composition. More preferably, those containing an (meth)acrylate functional group, for example, relatively low-molecular weight polyester resins, polyether resins, acrylic resins, epoxy resins, urethane resins, alkyd resins, spiroacetal resins, polybutadiene resins, and polythiol polyether resins, polyalcohols, di(meth) acrylates such as ethylene glycol di(meth)acrylate and pentaerythritol di(meth)acrylate monostearate; tri(meth)acrylates such as trimethylolpropane tri(meth)acrylate, pentaerithritol tri(meth) acrylate, and pentaerithritol tetra(meth)acrylate derivatives, dipentaerithritol penta(meth)acrylate or other monomers as polyfunctional compounds, or oligomers such as epoxy acrylate or urethane acrylate, may be used.

Regarding the hardcoat layer in the antireflection film according to the present invention, even when the hardcoat layer as such does not have an electrically conductive function, the antistatic effect can be attained even on the hardcoat layer by virtue of the effect attained by the underlying electrically conductive layer. It should be noted that, since the low refractive index layer has a much smaller thickness than the hardcoat layer, the antistatic effect is not deteriorated even when it is further provided on the hardcoat layer. In order to realize better antistatic properties, preferably, gold and/or nickel surface treated organic beads of polystyrenes, acrylic resins, epoxy resins, polyamide resins, polyurethane resins or the like, or spherical powders of benzoguanamine-melanine-formaldehyde condensates are added as electrically conductive fine particles to the hardcoat composition, and the average particle diameter is preferably about 5 μm.

The addition amount is preferably as small as possible from the viewpoint of avoiding an influence on the total light transmittance. Preferably, the addition amount is 0.001 to 1 part by mass based on 100 parts by mass of the hardcoat component.

Regarding the hardcoat layer in the antireflection laminate according to the present invention, the thickness of the layer after curing is preferably in the range of 0.1 to 100 μm, preferably 0.8 to 20 μm. When the layer thickness is in the above-defined thickness range, satisfactory hardcoat properties and resistance to cracking against external impact can be imparted.

From the viewpoint of preventing the occurrence of interference fringes in the antireflection film, the refractive index of the hardcoat layer in the antireflection laminate according to the present invention is preferably such that both the absolute value of the difference in refractive index between the hardcoat layer and the transparent base material film and the absolute value of the difference in refractive index between the hardcoat layer and the antistatic layer are not more than 0.03.

Low Refractive Index Layer

The low refractive index layer stacked onto the uppermost layer of the antireflection film according to the present invention may be formed by a conventional method commonly used in low refractive index layer formation. For example, the low refractive index layer may be formed by forming a coating film using a coating liquid containing low refractive index inorganic fine particles such as silica and magnesium fluoride and a binder resin, a coating liquid containing low refractive index inorganic fine particles such as void-containing silica or magnesium fluoride and a binder resin, or a coating liquid containing a fluororesin or the like, or by vapor depositing low refractive index inorganic fine particles to form a thin film.

Properties of Antireflection Film

The antistatic layer in the antireflection film according to the present invention, when the layer thickness is 0.05 to 5.0 μm, has a surface resistivity of not more than $1.0\times10^{13}$ Ω/□, preferably not more than $1.0\times10^{8}$ Ω/□.

In the antireflection film according to the present invention, that is, in an antireflection film comprising a transparent base material film and an antistatic layer formed using the composition for antistatic layer formation according to the present invention, an ionizing radiation curing-type resin-containing hardcoat layer, and a low refractive index layer provided in that order on the transparent base material film, the occurrence of interference fringes can be prevented by bringing both the absolute value of the difference in refractive index between the transparent base material film and the antistatic layer and the absolute value of the difference in refractive index between the antistatic layer and the hardcoat layer to not more than 0.03. For example, typically, when the refractive index of the transparent base material film and the refractive index of the hardcoat layer each are about 1.5, the refractive index of the antistatic layer is 1.50±0.03.

The transparency of the antireflection film according to the present invention is preferably such that, after coating all layers including the transparent base material film, the antistatic layer, the hardcoat layer, and the low refractive index layer, the haze value specified in JIS K 7361-1 is identical to the haze value of the base material per se, or the difference in haze value between the assembly and the base material per se is not more than 1.5%.

Image Display Device

The antireflection film according to the present invention is particularly suitable for use in the formation of at least one layer, particularly a low refractive index layer, in the multilayered antireflection film covering the display surface of image display devices such as liquid crystal display devices (LCDs), cathode ray tube display devices (CRTs), plasma display panels (PDPs), and electroluminescent displays (ELDs).

FIG. 3 is a typical sectional view of an example of a liquid crystal display device having a display surface covered with a multilayered antireflection film comprising the antireflection film according to the present invention as a light transparent layer. In a liquid crystal display device 101, a color filter 24 comprising a pixel part 22 of RGB (22R, 22G, 22B) and a black matrix layer 23 provided on one side of a glass substrate 21 on its display surface side is provided. A transparent electrode layer 25 is provided on the pixel part 22 in the color filter. A transparent electrode layer 27 is provided on one side of the glass substrate 26 on the backlight side. The glass substrate 26 on the backlight side and the color filter 24 disposed so that the transparent electrode layers 25, 27 face each other while providing a predetermined gap therebetween. The periphery of the assembly is bonded with a sealing material 28. A liquid crystal L is sealed into the gap, and an aligning film 29 is formed on the outer surface of the glass substrate 26 on its backside. A polarizing film 10 with the antireflection film according to the present invention stacked thereon is applied onto the outer surface of the glass substrate 21 on its display surface side. A backlight unit 11 is disposed behind the assembly.

Second aspect of invention

According to the second aspect of the present invention, there is provided an antireflection film formed using the composition for an antistatic layer described in the first aspect of the present invention. Accordingly, in the second aspect of the present invention, the composition for antistatic layer formation and the like may be the same as those in the first aspect of the present invention except for the following points. The layer construction of the antireflection film in the second aspect of the present invention is base material/hardcoat layer/antistatic layer/low refractive index layer.

Antistatic Layer

In the antireflection film according to the present invention, when the thickness of the antistatic layer is 50 nm to 150 nm, a surface resistivity of not more than $1.0\times10^{13}$ Ω/□ necessary for the prevention of dust adherence can be realized. When the surface resistivity is $1.0\times10^{13}$ Ω/□ to $1.0\times10^{12}$ Ω/□, electrification occurs but electrostatic charges are not accumulated and, thus, dust adherence preventive properties can be imparted to the film or the like. Preferably, the surface resistivity is in the range of $1.0\times10^{12}$ Ω/□ to $1.0\times10^{10}$ Ω/□ in which electrification of electrostatic charges occurs but the electrostatic charges are immediately attenuated. More preferably, the surface resistivity is not more than $1.0\times10^{10}$ Ω/□, most preferably not more than $1.0\times10^{8}$ Ω/□ in which electrification does not occur.

Proper Refractive Index of Antistatic Layer

The proper refractive index of the antistatic layer which provides proper reflected hue in the antireflection film depends upon the refractive index of the low refractive index layer stacked on the antistatic layer. Accordingly, when the refractive index of the low refractive index layer is lowered, the refractive index of the antistatic layer should also be lowered. For example, when the refractive index of the low refractive index layer is 1.42, the refractive index of the antistatic layer should be brought to not more than 1.56.

Low Refractive Index Layer

In the antireflection film according to the present invention, the thickness of the low refractive index layer is 50 nm to 150 nm.

Properties of Antireflection Film

The refractive index of the antireflection film according to the present invention can be regulated to such a value that can prevent the occurrence of coloring, that is, so that the absolute value of hue a* and the absolute value of hue b* are not more than 7 and not more than 6, respectively, as specified in JIS Z 8729.

Third Aspect of Invention

Composition for Antistatic Layer Formation (Coating Composition for Antistatic Layer Formation)

In the third aspect of the present invention, components, preparation methods and the like other than the following electrically conductive metal oxide fine particles may be the same as those in the first aspect of the present invention.

Electrically Conductive Metal Oxide Fine Particles (1) Type

The void-containing electrically conductive metal oxide fine particles used in the present invention are used as an antistatic agent for imparting electrostatic properties of the coating film and are selected from the group consisting of, for example, tin oxide ($SnO_2$), antimony tin oxide (ATO), indium tin oxide (ITO), antimony oxide ($Sb_2O_5$), aluminum zinc oxide (AZO), gallium zinc oxide, and mixtures thereof in which each of the particles contain voids.

(2) Shape; Particle Diameter

The particle diameter of void-containing electrically conductive metal oxide fine particles used in the present invention is preferably 5 nm to 100 nm, more preferably 30 nm to 60 nm. When the particle diameter is in the above-defined range, the transparency of the particles is excellent and, at the same time, the dispersion of fine particles of the electrically conductive metal oxide becomes easy.

The shape of the void-containing electrically conductive metal oxide is such that the interior surrounded by the outer shell contains voids and the outer shell may be porous. The thickness of the outer shell layer is preferably not less than 1 nm and not more than 30 nm. When the thickness of the outer shell layer is not less than 1 nm, the outer shell layer can cover the whole particle and, thus, the voids in the interior of the particle and the porous structure can be maintained without the entry of the binder component or the like into the interior of the fine particle. Accordingly, the effect of the low refractive index can be satisfactorily exhibited. When the thickness of the outer shell layer is not more than 30 nm, the fine particles can be maintained in a porous state and the effect of reducing the refractive index can be satisfactorily attained.

In the present invention, the wording "containing voids" as used herein refers to electrically conductive metal oxides fine particles or aggregates of the fine particles having a refractive index which, as a result of the adoption of a structure in which the interior of fine particles of an electrically conductive metal oxide is filled with gas and/or the adoption of a gas-containing porous structure, or as a result of the formation of aggregates of fine particles and when the gas is air having a refractive index of 1.0, has been lowered inversely proportionally to the percentage occupation of air in fine particles as compared with the refractive index inherent in the fine particles per se.

(3) Production Process

The void-containing electrically conductive metal oxide fine particles may be produced, for example, by a production process described in Japanese Patent Laid-Open No. 233611/2001. For example, a dispersion liquid of void-containing electrically conductive metal oxide fine particles may be produced by preparing a dispersion liquid of core particles of a mixture of an inorganic compound other than a contemplated metal oxide with a contemplated metal oxide, then adding a contemplated metal oxide to the core particle dispersion liquid to form a covering layer of the contemplated metal oxide onto the surface of the core particle, and then adding an acid to remove a part or the whole of the core particle.

In preparing a core particle dispersion liquid, a dispersion liquid of seed particles can be used as a starting material. In this case, seed particles usable herein include fine particles of inorganic oxides such as $SiO_2$, $Al_2O_3$, $TiO_2$, $ZrO_2$, and $CeO_2$ or composite oxides thereof, for example, $SiO_2$—$Al_2O_3$, $TiO_2$—$Al_2O_3$, $TiO_2$—$ZrO_2$, $SiO_2$—$TiO_2$, and $SiO_2$—$TiO_2$—$Al_2O_3$. In general, their sols may be used. The dispersion liquid of such seed particles can be prepared by a conventional method. The core particle dispersion liquid can be produced by adding the above core particle component to the seed particle dispersion liquid thus obtained.

Antireflection Film

In the antireflection film according to the present invention, an antistatic layer is formed using the composition for antistatic layer formation in the third aspect of the present invention. Accordingly, for example, the layer construction except for the antistatic layer, and an image display layer using the antireflection film may be the same as those in the first aspect of the present invention.

Fourth Aspect of Invention

According to the fourth aspect of the present invention, there is provided an antireflection film formed using the composition for an antistatic layer described in the third aspect of the present invention. Accordingly, in the fourth aspect of the present invention, the composition for antistatic layer formation and the like may be the same as those in the third aspect of the present invention except for the following points. The layer construction of the antireflection film in the fourth aspect of the present invention is base material/hardcoat layer/antistatic layer/low refractive index layer.

Antistatic Layer

In the antireflection film according to the present invention, when the thickness of the antistatic layer is 50 nm to 150 nm, a surface resistivity of not more than $1.0 \times 10^{13}$ $\Omega/\square$ necessary for the prevention of dust adherence can be realized. When the surface resistivity is $1.0 \times 10^{13}$ $\Omega/\square$ to $1.0 \times 10^{12}$ $\Omega/\square$, electrification occurs but electrostatic charges are not accumulated and, thus, dust adherence preventive properties can be imparted to the film or the like. Preferably, the surface resistivity is in the range of $1.0 \times 10^{12}$ $\Omega/\square$ to $1.0 \times 10^{10}$ $\Omega/\square$ in which electrification of electrostatic charges occurs but the electrostatic charges are immediately attenuated. More preferably, the surface resistivity is not more than $1.0 \times 10^{10}$ $\Omega/\square$, most preferably not more than $1.0 \times 10^{8}$ $\Omega/\square$ in which electrification does not occur.

Proper Refractive Index of Antistatic Layer

The proper refractive index of the antistatic layer which provides proper reflected hue in the antireflection film depends upon the refractive index of the low refractive index layer stacked on the antistatic layer. Accordingly, when the refractive index of the low refractive index layer is lowered, the refractive index of the antistatic layer should also be lowered. For example, when the refractive index of the low refractive index layer is 1.42, the refractive index of the antistatic layer should be brought to not more than 1.56.

Low Refractive Index Layer

In the antireflection film according to the present invention, the thickness of the low refractive index layer is 50 nm to 150 nm.

Properties of Antireflection Film

The refractive index of the antireflection film according to the present invention can be regulated to such a value that can prevent the occurrence of coloring, that is, so that the absolute value of hue a* and the absolute value of hue b* are not more than 7 and not more than 6, respectively, as specified in JIS Z 8729.

EXAMPLES

First Aspect of Invention

In the following Examples A1 and A2 and Comparative Example A1, regarding the evaluation of the antistatic layer, the refractive index of the coating film was measured with a spectroscopic ellipsometer (UVSEL, manufactured by Johann Evon; measuring wavelength 633 nm). For the formed antireflection films, the surface resistivity ($\Omega/\square$) of the outermost surface of the laminate was measured with a high resistivity meter (Hiresta•UP, manufactured by Mitsubishi Chemical Corporation) under conditions of applied voltage 100 V and 10 sec. For interference unevenness, visual inspection was carried out with an interference fringe testing lamp (Na lamp) manufactured by FUNATECH CO., LTD. When interference fringes were hardly observed, the interference unevenness was evaluated as good (○); when interference fringes were indistinctly observed, the interference unevenness was evaluated as fair (Δ); and when interference fringes were distinctly observed, the interference unevenness was evaluated as failure (x). The reflectance was measured with a spectrophotometer (UV-3100PC, manufactured by Shimadzu Seisakusho Ltd.) provided with a 5° C. regular reflection measuring device. The reflectance is the minimum value (minimum reflectance) at a wavelength around 550 nm.

Example A1

Where Antimony Tin Oxide-Coated Silica ($SiO_2$) Fine Particles are Used

Preparation of Composition for Antistatic Layer Formation

A composition for antistatic layer formation was prepared by mixing of ingredients according to the following formulation.

| | |
|---|---|
| Anitimony tin oxide-coated silica ($SiO_2$) fine particle dispersion liquid (average particle diameter 50 nm, coverage 30% by weight, solid content 30%, solvent: methyl isobutyl ketone) | 33.3 parts by mass |
| EO modified dipentaerythritol hexacrylate (EO modified DPHA) (DPEA-12: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation of Laminate Comprising Base Material Film/Antistatic Layer

A composition for antistatic layer formation having the above chemical composition was bar coated on an 80 μm-thick triacetate cellulose (TAC) film. The coating was dried to remove the solvent. Thereafter, ultraviolet light was applied at a dose of about 20 mJ/cm² with an ultraviolet irradiation device to cure the dried coating and thus to form an about 1 μm-thick antistatic layer. The refractive index of the coating film thus formed was measured by the above method. The results are shown in Table 1 below.

Preparation of Composition for Hardcoat Layer Formation

A coating composition for hardcoat layer formation was prepared by mixing of ingredients according to the following formulation.

| | |
|---|---|
| Pentaerythritol triacrylate (PETA) | 30.0 parts by mass |
| Irgacure 907 (tradename, manufactured by Ciba Specialty Chemicals K.K.) | 1.5 parts by mass |
| Methyl isobutyl ketone | 73.5 parts by mass |
| Organic beads having an average particle diameter of 5 μm subjected to surface treatment with gold and nickel (manufactured by The Nippon Chemical Industrial Co., Ltd., tradename: Bright 20 GNR 4.6-EH) | 0.15 part by mass |

Preparation of Composition for Low Refractive Index Layer Formation

A coating composition for the formation of a low refractive index layer having a refractive index of 1.37 was prepared by mixing of ingredients according to the following formulation.

| | |
|---|---|
| Hollow silica sol (average particle diameter 50 nm, 20% methyl isobutyl ketone solution) | 12.85 parts by weight |
| Pentaerythritol triacrylate (PETA) | 1.43 parts by weight |
| Irgacure 907 (tradename, manufactured by Ciba Specialty Chemicals K.K.) | 0.1 part by weight |
| TSF4460 (tradename, alkyl polyether modified silicone oil, manufactured by GE Toshiba Silicone Co., Ltd.) | 0.12 part by weight |
| Methyl isobutyl ketone | 85.5 parts by weight |

Preparation of Coating Film (Base Material Film/Antistatic Layer/Hardcoat Layer/Low Refractive Index Layer)

A coating composition for hardcoat layer formation having the above chemical composition was bar coated onto base material film/antistatic layer, and the coating was dried to remove the solvent. Thereafter, ultraviolet light was applied to the dried coating with an ultraviolet light irradiation device (Fusion UV Systems Japan KK, light source H bulb) at a dose of 100 mJ/cm² to cure the dried coating and thus to form a 5 μm-thick hardcoat layer. Thus, a laminated coated film of base material film/antistatic layer/hardcoat layer thus obtained was provided.

The coating composition for low refractive index layer formation was bar coated onto the hardcoat layer in the laminated coated film and was dried to remove the solvent. Thereafter, the coating was irradiated with ultraviolet light at a dose of 200 mJ/cm² with an ultraviolet irradiation device (Fusion UV Systems Japan KK, light source H bulb) to cure the coating film and thus to form an about 100 nm-thick low refractive index layer. Thus, an antireflection film of Example A1 having a layer construction of base material film/antistatic layer/hardcoat layer/low refractive index layer was obtained. For the antireflection film, the surface resistivity, interference unevenness, and minimum reflectance were measured by the above methods. The results are shown in Table 1 below.

Example A2

Where Indium Tin Oxide-Coated Silica ($SiO_2$) Fine Particles are Used

Preparation of Composition for Antistatic Layer Formation

A composition for antistatic layer formation was prepared by mixing of ingredients according to the following formulation.

| | |
|---|---|
| Indium tin oxide-coated silica ($SiO_2$) fine particle dispersion liquid (average particle diameter 50 nm, coverage 30% by weight, solid content 30%, solvent: methyl isobutyl ketone) | 33.3 parts by mass |
| EO modified DPHA (DPEA-12: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation and Evaluation of Laminate Comprising Base Material Film/Antistatic Layer An about 1 μm-thick antistatic layer was formed in the same manner as in Example A1, except that the composition for antistatic layer formation prepared in the above step was used. The refractive index of the antistatic layer was measured. The results are shown in Table 1 below.

Preparation of Coating Film (Base Material Film/Antistatic Layer/Hardcoat Layer/Low Refractive Index Layer)

An antireflection film of Example A2 having a layer construction of TAC base material film/antistatic layer/hardcoat layer/low refractive index layer was prepared using the same composition for hardcoat layer formation and composition for low refractive index layer formation as used in Example A1 in the same manner as in Example A1. For the antireflection film, the surface resistivity, interference unevenness, and minimum reflectance were measured by the above methods. The results are shown in Table 1 below.

Comparative Example A1

Where Conventional ITO Fine Particles are Used

Preparation of Composition for Antistatic Layer Formation
A composition for antistatic layer formation was prepared by mixing of ingredients according to the following formulation.

| | |
|---|---|
| Indium tin oxide dispersion liquid (average particle diameter 30 nm, solid content 30%, solvent: methyl isobutyl ketone) | 33.3 parts by mass |
| PETA (PET-30: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation and Valuation of Laminate Comprising Base Material Film/Antistatic Layer
An about 1 μm-thick antistatic layer was formed in the same manner as in Example A1, except that the composition for antistatic layer formation prepared in the above step was used. The refractive index of the antistatic layer was measured. The results are shown in Table 1 below.

Preparation of Coating Film (Base Material Film/Antistatic Layer/Hardcoat Layer/Low Refractive Index Layer)
An antireflection film of Comparative Example A1 having a layer construction of TAC base material film/antistatic layer/hardcoat layer/low refractive index layer was prepared using the same composition for hardcoat layer formation and composition for low refractive index layer formation as used in Example A1 in the same manner as in Example A1. For the antireflection film, the surface resistivity, interference unevenness, and minimum reflectance were measured by the above methods. The results are shown in Table 1 below.

TABLE 1

| | evaluation | | | |
|---|---|---|---|---|
| Example | Refractive index | Surface resistivity Ω/□ | Unevenness of interference | Minimum reflectance (%) |
| Ex. A1 | 1.50 | $1.9 \times 10^{10}$ | ○ | 1.0 |
| Ex. A2 | 1.52 | $8.5 \times 10^{8}$ | ○ | 1.0 |
| Comp. Ex. A1 | 1.60 | $7.2 \times 10^{7}$ | x | 1.0 |

Second Aspect of Invention
In the following Examples B1 and B2 and Comparative Example B1, regarding the evaluation of the antistatic layer, the surface resistivity (Ω/□) of the outermost surface of the laminate was measured with a high resistivity meter (Hiresta•UP, manufactured by Mitsubishi Chemical Corporation) under conditions of applied voltage 100 V. The reflectance and reflected hue were measured with a spectrophotometer (UV-3100PC (tradename), manufactured by Shimadzu Seisakusho Ltd.) provided with a 5° C. regular reflection measuring device. The reflectance is the minimum value (minimum reflectance) at a wavelength around 550 nm.

Example B1

Where ATO-Coated Silica Fine Particles are Used

Preparation of Composition for Antistatic Layer Formation
A composition for the formation of an antistatic layer having a refractive index of 1.50 was prepared by mixing of ingredients according to the following formulation.

| | |
|---|---|
| Anitimony tin oxide-coated silica ($SiO_2$) fine particle dispersion liquid (average particle diameter 50 nm, coverage 30% by weight, solid content 30%, solvent: methyl isobutyl ketone) | 33.3 parts by mass |
| EO modified dipentaerythritol hexacrylate (EO modified DPHA) (DPEA-12: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation of Composition for Hardcoat Layer Formation
A composition for hardcoat layer formation was prepared by mixing of ingredients according to the following formulation.

| | |
|---|---|
| Pentaerythritol triacrylate (PETA) | 30.0 parts by mass |
| Irgacure 907 (tradename, manufactured by Ciba Specialty Chemicals K.K.) | 1.5 parts by mass |
| Methyl isobutyl ketone | 73.5 parts by mass |

Preparation of Composition for Low Refractive Index Layer Formation
A composition for the formation of a low refractive index layer having a refractive index of 1.37 was prepared by mixing of ingredients according to the following formulation.

| | |
|---|---|
| Hollow silica sol (20% methyl isobutyl ketone solution) | 12.85 parts by mass |
| Pentaerythritol triacrylate (PETA) | 1.43 parts by mass |
| Irgacure 907 (tradename, manufactured by Ciba Specialty Chemicals K.K.) | 0.1 part by mass |
| TSF4460 (tradename, alkyl polyether modified silicone oil, manufactured by GE Toshiba Silicone Co., Ltd.) | 0.12 part by mass |
| Methyl isobutyl ketone | 85.5 parts by mass |

Preparation of Antireflection Film (Base Material Film/Hardcoat Layer/Antistatic Layer/Low Refractive Index Layer)
The composition for hardcoat layer formation was bar coated onto an 80 μm-thick triacetate cellulose (TAC) film. The coating was dried to remove the solvent. Thereafter, ultraviolet light was applied at a dose of 20 mJ/cm² with an ultraviolet irradiation device to cure the dried coating and thus to form a 5 μm-thick hardcoat layer.

The composition for antistatic layer formation was bar coated onto the laminate of base material film/hardcoat layer.

The coating was dried to remove the solvent. Thereafter, ultraviolet light was applied at a dose of 50 mJ/cm$^2$ with an ultraviolet irradiation device (light source H bulb, manufactured by Fusion UV Systems Japan KK) to cure the dried coating and thus to form an about 90 nm-thick antistatic layer.

The composition for low refractive index formation was bar coated onto the laminate of base material film/hardcoat layer/antistatic layer formation. The coating was dried to remove the solvent. Thereafter, ultraviolet light was applied at a dose of 200 mJ/cm$^2$ with an ultraviolet irradiation device (light source H bulb, manufactured by Fusion UV Systems Japan KK) to cure the dried coating and thus to form an about 100 nm-thick low refractive index layer. Thus, an antireflection film of Example B1 was prepared. For the antireflection film of Example B1, the minimum reflectance, reflected hue, and surface resistiviy were measured in the same manner as described above. The results are shown in Table 2 below.

Example B2

Where ITO-Coated Silica Fine Particles are Used

Preparation of Composition for Antistatic Layer Formation

A composition for the formation of an antistatic layer having a refractive index of 1.52 was prepared by mixing of ingredients according to the following formulation.

| | |
|---|---|
| Indium tin oxide-coated silica (SiO$_2$) fine particle dispersion liquid (average particle diameter 45 nm, coverage 40% by weight, solid content 30%, solvent: methyl isobutyl ketone) | 33.3 parts by mass |
| EO modified DPHA (DPEA-12: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation of Antireflection Film (Base Material Film/Hardcoat Layer/Antistatic Layer/Low Refractive Index Layer)

The composition for hardcoat layer formation having the same formulation as in Example B1 was coated onto an 80 μm-thick triacetate cellulose (TAC) film in the same manner as in Example B1.

The composition for an antistatic layer formation for Example B2 prepared above was coated onto the laminate of base material film/hardcoat layer in the same manner as in Example B1. The coating was dried and cured in the same manner as in Example B1 to form an about 90 nm-thick antistatic layer.

The composition for low refractive index layer formation having the same formulation as in Example B1 was coated onto the laminate of base material film/hardcoat layer/antistatic layer in the same manner as in Example B1. The coating was dried and cured in the same manner as in Example B1 to form an about 100 nm-thick low refractive index layer. Thus, an antireflection film of Example B2 was prepared. For the antireflection film of Example B2, the minimum reflectance, reflected hue, and surface resistivity were measured in the same manner as described above. The results are shown in Table 2 below.

Comparative Example B1

Where Conventional ITO Fine Particles are Used

Preparation of Composition for Antistatic Layer Formation

A composition for the formation of an antistatic layer having a refractive index of 1.60 was prepared by mixing of ingredients according to the following formulation.

| | |
|---|---|
| Indium tin oxide dispersion liquid (average particle diameter 30 nm, solid content 30%, solvent: methyl isobutyl ketone) | 33.3 parts by mass |
| PETA (PET-30: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation of Antireflection Film (Base Material Film/Hardcoat Layer/Antistatic Layer/Low Refractive Index Layer)

The composition for hardcoat layer formation having the same formulation as in Example B1 was coated onto an 80 μm-thick triacetate cellulose (TAC) film in the same manner as in Example B1.

The composition for an antistatic layer formation for Example B2 prepared above was coated onto the laminate of base material film/hardcoat layer in the same manner as in Example B1. The coating was dried and cured in the same manner as in Example B1 to form an about 85 nm-thick antistatic layer.

The composition for low refractive index layer formation having the same formulation as in Example B1 was coated onto the film of base material film/hardcoat layer/antistatic layer in the same manner as in Example B1. The coating was dried and cured in the same manner as in Example B1 to form an about 100 nm-thick low refractive index layer. Thus, an antireflection film of Comparative Example B1 was prepared. For the antireflection film of Comparative Example B1, the minimum reflectance, reflected hue, and surface resistivity were measured in the same manner as described above. The results are shown in Table 2 below.

TABLE 2

| | evaluation | | | |
|---|---|---|---|---|
| | Minimum reflectance | Reflected hue | | Surface resistivity |
| Example | (%) | a* | b* | Ω/□ |
| Ex. B1 | 1.32 | 1.75 | −1.06 | 2.5 × 10$^{11}$ |
| Ex. B2 | 1.03 | 4.7 | −3.80 | 5.6 × 10$^9$ |
| Comp. Ex. B1 | 0.25 | 10.9 | −13.3 | 7.2 × 10$^7$ |

The results shown in Table 2 show that, for both Examples B1 and B2, the reflected hue has an absolute value of a hue a* of not more than 7 and an absolute value of a hue b* of not more than 6, indicating that coloring at the time of reflection is prevented. Further, since the minimum reflectance and surface resistivity fall within respective good ranges, the antireflection films are good as antistatic antireflection films.

Third Aspect of Invention

In the following Examples C1 and C2 and Comparative Example C1, regarding the evaluation of the antistatic layer, the refractive index of the coating film was measured with a spectroscopic ellipsometer (UVSEL, manufactured by Johann Evon; measuring wavelength 633 nm). For the formed antireflection films, the surface resistivity ($\Omega/\square$) of the outermost surface of the laminate was measured with a high resistivity meter (Hiresta•UP, manufactured by Mitsubishi Chemical Corporation) under conditions of applied voltage 100 V and 10 sec. For interference unevenness, visual inspection was carried out with an interference fringe testing lamp (Na lamp) manufactured by FUNATECH CO., LTD. When interference fringes were hardly observed, the interference unevenness was evaluated as good (⊚); when interference fringes were indistinctly observed, the interference unevenness was evaluated as fair (Δ); and when interference fringes were distinctly observed, the interference unevenness was evaluated as failure (×). The reflectance was measured with a spectrophotometer (UV-3100PC, manufactured by Shimadzu Seisakusho Ltd.) provided with a 5° C. regular reflection measuring device. The reflectance is the minimum value (minimum reflectance) at a wavelength around 550 nm.

Example C1

Where Conventional Hollow ATO Fine Particles are Used

Preparation of Composition for Antistatic Layer Formation

A composition for antistatic layer formation was prepared by mixing of ingredients according to the following formulation.

| | |
|---|---|
| Hollow anitimony tin oxide dispersion liquid (average particle diameter 60 nm, outer shell thickness 15 nm, refractive index 1.50, solid content 30%, solvent: methyl isobutyl ketone) | 33.3 parts by mass |
| EO modified dipentaerythritol hexacrylate (EO modified DPHA) (DPEA-12: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation of Laminate Comprising Base Material Film/Antistatic Layer

A composition for antistatic layer formation having the above chemical composition was bar coated on an 80 μm-thick triacetate cellulose (TAC) film. The coating was dried to remove the solvent. Thereafter, ultraviolet light was applied at a dose of about 20 mJ/cm² with an ultraviolet irradiation device to cure the dried coating and thus to form an about 1 μm-thick antistatic layer. The refractive index and surface resistivity of the antistatic layer in the laminate was measured by the above method. The results are shown in Table 3 below.

Preparation of Composition for Hardcoat Layer Formation

A composition for hardcoat layer formation was prepared by mixing of ingredients according to the following formulation.

| | |
|---|---|
| Pentaerythritol triacrylate (PETA) | 30.0 parts by mass |
| Irgacure 907 (tradename, manufactured by Ciba Specialty Chemicals K.K.) | 1.5 parts by mass |
| Methyl isobutyl ketone | 73.5 parts by mass |

Organic beads having an average particle diameter of 5 μm subjected to surface treatment with gold and nickel (manufactured by The Nippon Chemical Industrial Co., Ltd., tradename: Bright 20 GNR 4.6-EH) 0.15 part by mass Preparation of Composition for Low Refractive Index Layer Formation A composition for the formation of a low refractive index layer having a refractive index of 1.37 was prepared by mixing of ingredients according to the following formulation.

| | |
|---|---|
| Hollow silica sol (average particle diameter 0.03 μm, 20% methyl isobutyl ketone solution) | 12.85 parts by weight |
| Pentaerythritol triacrylate (PETA) | 1.43 parts by weight |
| Irgacure 907 (tradename, manufactured by Ciba Specialty Chemicals K.K.) | 0.1 part by weight |
| TSF4460 (tradename, alkyl polyether modified silicone oil, manufactured by GE Toshiba Silicone Co., Ltd.) | 0.12 part by weight |
| Methyl isobutyl ketone | 85.5 parts by weight |

Preparation of Antireflection Film (Laminate of Base Material Film/Antistatic Layer/Hardcoat Layer/Low Refractive Index Layer)

A composition for hardcoat layer formation having the above chemical composition was bar coated onto the antistaitc layer in the laminate of base material film/antistatic layer prepared in the above step base material film/antistatic layer, and the coating was dried to remove the solvent. Thereafter, ultraviolet light was applied to the dried coating with an ultraviolet light irradiation device (Fusion UV Systems Japan KK, light source H bulb) at a dose of 100 mJ/cm² to cure the dried coating and thus to form a 5 μm-thick hardcoat layer. Thus, a laminate of base material film/antistatic layer/hardcoat layer thus obtained was provided.

The composition for low refractive index layer formation was bar coated onto the hardcoat layer in the laminate of base material film/antistatic layer/hardcoat layer and was dried to remove the solvent. Thereafter, the coating was irradiated with ultraviolet light at a dose of 200 mJ/cm² with an ultraviolet irradiation device (Fusion UV Systems Japan KK, light source H bulb) to cure the coating film and thus to form an about 100 nm-thick low refractive index layer. Thus, an antireflection film of Example C1 having a layer construction of base material film/antistatic layer/hardcoat layer/low refractive index layer was obtained. For the antireflection film, the interference unevenness and minimum reflectance were measured by the above methods. The results are shown in Table 3 below.

Example C2

Where Hollow ITO Fine Particles are Used

Preparation of Composition for Antistatic Layer Formation

A composition for antistatic layer formation was prepared by mixing of ingredients according to the following formulation.

| | |
|---|---|
| Hollow indium tin oxide dispersion liquid (average particle diameter 60 nm, outer shell thickness 10 nm, refractive index 1.46, solid content 30%, solvent: methyl isobutyl ketone) | 33.3 parts by mass |
| EO modified DPHA (DPEA-12: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation and Evaluation of Laminate of Base Material Film/Antistatic Layer

A 1 μm-thick antistatic layer was prepared in the same manner as in Example C1, followed by the measurement of the refractive index and surface resistivity. The results are shown in Table 3 below.

Preparation of Antireflection Film (Laminate of Base Material Film/Antistatic Layer/Hardcoat Layer/Low Refractive Index Layer)

An antireflection film of Example C2 having a layer construction of TAC base material film/antistatic layer/hardcoat layer/low refractive index layer was prepared using the same composition for hardcoat layer formation and composition for low refractive index layer formation as in Example C1 in the same manner as in Example C1. For the antireflection film thus obtained, the unevenness of interference and minimum reflectance were measured by the above methods. The results are shown in Table 3 below.

Comparative Example C1

Where Conventional ITO Fine Particles are Used

Preparation of Composition for Antistatic Layer Formation

A composition for antistatic layer formation was prepared by mixing ingredients according to the following formulation.

| | |
|---|---|
| Indium tin oxide dispersion liquid (average particle diameter 60 nm, solid content 30%, solvent: methyl isobutyl ketone) | 33.3 parts by mass |
| Pentaerythritol triacrylate (PETA) (PET-30: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation and Evaluation of Laminate of Base Material Film/Antistatic Layer

An about 1 μm-thick antistatic layer was prepared in the same manner as in Example C1, followed by the measurement of the refractive index and surface resistivity. The results are shown in Table 3 below.

Preparation of Antireflection Film (Laminate of Base Material Film/Antistatic Layer/Hardcoat Layer/Low Refractive Index Layer)

An antireflection film of Comparative Example C1 having a layer construction of TAC base material film/antistatic layer/hardcoat layer/low refractive index layer was prepared using the same composition for hardcoat layer formation and composition for low refractive index layer formation as in Example C1 in the same manner as in Example C1. For the antireflection film thus obtained, the unevenness of interference and minimum reflectance were measured by the above methods. The results are shown in Table 3 below.

TABLE 3

| | evaluation | | | |
|---|---|---|---|---|
| Example | Refractive index | Surface resistivity $\Omega/\square$ | Unevenness of interference | Minimum reflectance (%) |
| Ex. C1 | 1.50 | $8.6 \times 10^8$ | ○ | 1.0 |
| Ex. C2 | 1.48 | $1.8 \times 10^8$ | ○ | 1.0 |
| Comp. Ex. C1 | 1.60 | $7.2 \times 10^7$ | × | 1.0 |

Fourth Aspect of Invention

In the following Examples D1 and D2 and Comparative Example D1, regarding the evaluation of the antistatic layer, the surface resistivity ($\Omega/\square$) of the outermost surface of the laminate was measured with a high resistivity meter (Hiresta•UP, manufactured by Mitsubishi Chemical Corporation) at an applied voltage of 100 V. The reflectance and reflected hue were measured with a spectrophotometer (UV-3100PC (tradename), manufactured by Shimadzu Seisakusho Ltd.) provided with a 5° C. regular reflection measuring device. The reflectance is the minimum value (minimum reflectance) at a wavelength around 550 nm.

Example D1

Where Hollow ATO Fine Particles are Used

Preparation of Composition for Antistatic Layer Formation

A composition for the formation of an antistatic layer having a refractive index of 1.50 was prepared by mixing of ingredients according to the following formulation.

| | |
|---|---|
| Hollow anitimony tin oxide dispersion liquid (average particle diameter 60 nm, outer shell thickness 15 nm, refractive index 1.50, solid content 30%, solvent: methyl isobutyl ketone) | 33.3 parts by mass |
| EO modified dipentaerythritol hexacrylate (EO modified DPHA) (DPEA-12: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation of Composition for Hardcoat Layer Formation

A composition for hardcoat layer formation was prepared by mixing of ingredients according to the following formulation.

| | |
|---|---|
| Pentaerythritol triacrylate (PETA) | 30.0 parts by mass |
| Irgacure 907 (tradename, manufactured by Ciba Specialty Chemicals K.K.) | 1.5 parts by mass |
| Methyl isobutyl ketone | 73.5 parts by mass |

Preparation of Composition for Low Refractive Index Layer Formation

A composition for the formation of a low refractive index layer having a refractive index of 1.37 was prepared by mixing of ingredients according to the following formulation.

| | |
|---|---|
| Hollow silica sol (20% methyl isobutyl ketone solution) | 12.85 parts by mass |
| Pentaerythritol triacrylate (PETA) | 1.43 parts by mass |
| Irgacure 907 (tradename, manufactured by Ciba Specialty Chemicals K.K.) | 0.1 part by mass |
| TSF4460 (tradename, alkyl polyether modified silicone oil, manufactured by GE Toshiba Silicone Co., Ltd.) | 0.12 part by mass |
| Methyl isobutyl ketone | 85.5 parts by mass |

Preparation of Antireflection Film (Laminate of Base Material Film/Hardcoat Layer/Antistatic Layer/Low Refractive Index Layer)

The composition for hardcoat layer formation was bar coated onto an 80 μm-thick triacetate cellulose (TAC) film. The coating was dried to remove the solvent. Thereafter, ultraviolet light was applied at a dose of 20 mJ/cm² with an ultraviolet irradiation device to cure the dried coating and thus to form a 5 μm-thick hardcoat layer.

The composition for antistatic layer formation was bar coated onto the laminate of base material film/hardcoat layer. The coating was dried to remove the solvent. Thereafter, ultraviolet light was applied at a dose of 50 mJ/cm² with an ultraviolet irradiation device (light source H bulb, manufactured by Fusion UV Systems Japan KK) to cure the dried coating and thus to form an about 90 nm-thick antistatic layer.

The composition for low refractive index layer formation was bar coated onto the laminate of base material film/hardcoat layer/antistatic layer. The coating was dried to remove the solvent. Thereafter, ultraviolet light was applied at a dose of 200 mJ/cm² with an ultraviolet irradiation device (light source H bulb, manufactured by Fusion UV Systems Japan KK) to cure the dried coating and thus to form an about 100 nm-thick low refractive index layer. Thus, an antireflection film of Example D1 was prepared. For the antireflection film of Example D1, the minimum reflectance, reflected hue, and surface resistivity were measured in the same manner as described above. The results are shown in Table 4 below.

Example D2

Where Hollow ITO Fine Particles are Used

Preparation of Composition for Antistatic Layer Formation

A composition for the formation of an antistatic layer having a refractive index of 1.48 was prepared by mixing of ingredients according to the following formulation.

| | |
|---|---|
| Hollow indium tin oxide dispersion liquid (average particle diameter 60 nm, outer shell thickness 10 nm, refractive index 1.46, solid content 30%, solvent: methyl isobutyl ketone) | 33.3 parts by mass |
| EO modified DPHA (DPEA-12: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation of Antireflection Film (Laminate of Base Material Film/Hardcoat Layer/Antistatic Layer/Low Refractive Index Layer)

The composition for hardcoat layer formation having the same formulation as in Example D1 was coated onto an 80 μm-thick triacetate cellulose (TAC) film in the same manner as in Example D1.

The composition for an antistatic layer formation prepared above was coated onto the laminate of base material film/hardcoat layer in the same manner as in Example D1. The coating was dried and cured in the same manner as in Example D1 to form an about 90 nm-thick antistatic layer.

The composition for low refractive index layer formation having the same formulation as in Example D1 was coated onto the laminate of base material film/hardcoat layer/antistatic layer in the same manner as in Example D1. The coating was dried and cured in the same manner as in Example D1 to form an about 100 nm-thick low refractive index layer. Thus, an antireflection film of Example D2 was prepared. For the antireflection film of Example D2, the minimum reflectance, reflected hue, and surface resistivity were measured in the same manner as described above. The results are shown in Table 4 below.

Comparative Example D1

Where Conventional ITO Fine Particles are Used

Preparation of Composition for Antistatic Layer Formation

A composition for the formation of an antistatic layer having a refractive index of 1.60 was prepared by mixing of ingredients according to the following formulation.

| | |
|---|---|
| Indium tin oxide dispersion liquid (average particle diameter 60 nm, solid content 30%, solvent: methyl isobutyl ketone) | 33.3 parts by mass |
| PETA (PET-30: tradename, manufactured by Nippon Kayaku Co., Ltd.) | 10 parts by mass |
| Irgacure 184 (tradename, manufactured by Ciba Specialty Chemicals K.K.) | 0.5 part by mass |
| Methyl isobutyl ketone | 90.3 parts by mass |

Preparation of Antireflection Film (Laminate of Base Material Film/Hardcoat Layer/Antistatic Layer/Low Refractive Index Layer)

The composition for hardcoat layer formation having the same formulation as in Example D1 was coated onto an 80 μm-thick triacetate cellulose (TAC) film in the same manner as in Example D1.

The composition for antistatic layer formation prepared above for Comparative Example D1 was coated onto the laminate of base material film/hardcoat layer in the same manner as in Example D1. The coating was dried and cured in the same manner as in Example D1 to form an about 85 nm-thick antistatic layer.

The composition for low refractive index layer formation having the same formulation as in Example D1 was coated onto the film of base material film/hardcoat layer/antistatic layer in the same manner as in Example D1. The coating was dried and cured in the same manner as in Example D1 to form an about 100 nm-thick low refractive index layer. Thus, an antireflection film of Comparative Example D1 was prepared. For the antireflection film of Comparative Example D1, the minimum reflectance, reflected hue, and surface resistivity were measured in the same manner as described above. The results are shown in Table 4 below.

TABLE 4

| | evaluation | | | |
|---|---|---|---|---|
| | Minimum reflectance | Reflected hue | | Surface resistivity |
| Example | (%) | a* | b* | Ω/□ |
| Ex. D1 | 1.30 | 1.89 | −0.95 | $1.5 \times 10^9$ |
| Ex. D2 | 1.52 | 0.86 | −0.98 | $8.7 \times 10^8$ |
| Comp. Ex. D1 | 0.25 | 10.9 | −13.3 | $7.2 \times 10^7$ |

The results shown in Table 4 show that, for both Examples D1 and D2, the reflected hue has an absolute value of a hue a* of not more than 7 and an absolute value of a hue b* of not more than 6, indicating that coloring at the time of reflection is prevented. Further, since the minimum reflectance and surface resistivity fall within respective good ranges, the antireflection films are good as antistatic antireflection films.

The invention claimed is:

1. An antireflection film comprising an antistatic layer comprising electrically conductive fine particles and an ionizing radiation cured resin;
   wherein said electrically conductive fine particles each comprise a core particle covered with an electrically conductive material, the coverage of said electrically conductive material of said electrically conductive fine particles is not less than 10% by mass and not more than 60% by mass;
   wherein a refractive index of said core particle is lower than a refractive index of said electrically conductive material; and
   wherein said electrically conductive fine particles have a diameter of not less than 5 nm and not more than 100 nm.

2. An antireflection film comprising an antistatic layer comprising electrically conductive fine particles and an ionizing radiation cured resin;
   wherein said electrically conductive fine particles each comprise a core particle covered with an electrically conductive material selected from the group consisting of tin oxide, antimony tin oxide, indium tin oxide, antimony oxide, aluminum zinc oxide, gallium zinc oxide, and mixtures thereof;
   wherein a refractive index of said core particle is lower than a refractive index of said electrically conductive material; and
   wherein said electrically conductive fine particles have a diameter of not less than 5 nm and not more than 100 nm.

3. An antireflection film comprising an antistatic layer comprising electrically conductive fine particles and an ionizing radiation cured resin;
   wherein said electrically conductive fine particles each comprise a core particle covered with an electrically conductive material selected from the group consisting of gold, silver, copper, aluminum, iron, nickel, palladium, and platinum;
   wherein a refractive index of said core particle is lower than a refractive index of said electrically conductive material; and
   wherein said electrically conductive fine particles have a diameter of not less than 5 nm and not more than 100 nm.

4. The antireflection film according to claim 1 further comprising a transparent base material film, said antistatic layer, an ionizing radiation curing resin-containing hardcoat layer, and a low-refractive index layer provided in that order on said transparent base material film.

5. The antireflection film according to claim 4, wherein both an absolute value of a difference in refractive index between said transparent base material film and said antistatic layer and an absolute value of a difference in refractive index between said antistatic layer and said hardcoat layer are 0.03 or less.

6. The antireflection film according to claim 4, wherein, when a thickness of said antistatic layer is not less than 0.05 μm and not more than 5.00 μm, and wherein a surface resistivity is not more than $1.0 \times 10^{13}$ Ω/□.

7. An image display device comprising the antireflection film according to claim 4 provided on a surface of a display.

8. The antireflection film according to claim 4, wherein a thickness of said antistatic layer is not less than 50 nm and not more than 150 nm, where a thickness of said low-refractive index layer is not less than 50 nm and not more than 150 nm, and wherein a reflected hue of said antireflection film is such that an absolute value of a hue a* is not more than 7 and an absolute value of a hue b* is not more than 6.

9. The antireflection film according to claim 8, wherein a surface resistivity of said antireflection film is not more than $1.0 \times 10^{13}$ Ω/□.

10. An image display device comprising the antireflection film according to claim 8 provided on a surface of a display.

11. An antireflection film comprising an antistatic layer comprising void-containing electrically conductive metal oxide fine particles and an ionizing radiation cured resin;
    wherein said electrically conductive metal oxide fine particles have a diameter of not less than 5 nm and not more than 100 nm.

12. The antireflection film according to claim 11, wherein is said antistatic layer, said electrically conductive metal oxide fine particles comprise an outer shell layer containing voids.

13. The antireflection film according to claim 12, wherein in said antistatic layer, a thickness of said outer shell layer of said electrically conductive metal oxide is not less than 1 nm and not more than 30 nm.

14. The antireflection film according to claim 11, wherein in said antistatic layer, said electrically conductive metal oxide is selected from the group consisting of tin oxide, antimony tin oxide, indium tin oxide, antimony oxide, aluminum zinc oxide, gallium zinc oxide, and mixtures thereof.

15. The antireflection film according to claim 11, further comprising a transparent base material film, said antistatic layer, an ionizing radiation cured resin-containing hardcoat layer, and a low-refractive index layer provided in that order on said transparent base material film.

16. The antireflection film according to claim 15, wherein both an absolute value of a difference in refractive index between said transparent base material film and said antistatic layer and an absolute value of a difference in refractive index between said antistatic layer and said hardcoat layer are 0.03 or less.

17. The antireflection film according to claim 15 wherein, when a thickness of said antistatic layer is not less than 0.01 μm and not more than 5.00 μm, and a surface resistivity of said antireflection film is not more than $1.0 \times 10^{13}$ Ω/□.

18. An image display device comprising the antireflection film according to claim 15 provided on a surface of a display.

19. The antireflection film according to claim 15, wherein a thickness of said antistatic layer is not less than 50 nm and not more than 150 nm, wherein a thickness of said low-refractive index layer is not less than 50 nm and not more than 150 nm, and wherein a reflected hue of said antireflection film is such that an absolute value of a hue a* is not more than 7 and an absolute value of a hue b* is not more than 6.

20. The reflection film according to claim 19, wherein a surface resistivity of said antireflection film is not more than $1.0 \times 10^{13}$ Ω/□.

21. An image display device comprising the antireflection film according to claim 19 provided on a surface of a display.

* * * * *